United States Patent [19]
Weinmeier et al.

[11] Patent Number: 6,141,232
[45] Date of Patent: Oct. 31, 2000

[54] FIXED FREQUENCY FLYBACK CONVERTER

[75] Inventors: Harald Weinmeier; Günter Marka, both of Vienna, Austria

[73] Assignee: Siemens AG Osterreich, Vienna, Austria

[21] Appl. No.: 09/409,582

[22] Filed: Sep. 30, 1999

[30] Foreign Application Priority Data

Sep. 30, 1998 [AT] Austria ................................... 1631/98

[51] Int. Cl.[7] .......................... H02H 7/125; H02M 7/44; H02M 7/537
[52] U.S. Cl. .................. 363/97; 363/53; 363/131
[58] Field of Search ................. 363/21, 97, 131, 363/56

[56] References Cited

U.S. PATENT DOCUMENTS

| | | | |
|---|---|---|---|
| 5,598,324 | 1/1997 | Imamura et al. | 363/21 |
| 5,717,579 | 2/1998 | Sohner | 363/21 |
| 5,729,443 | 3/1998 | Pavlin | 363/97 |
| 5,734,564 | 3/1998 | Brkovic | 363/21 |
| 5,768,118 | 6/1998 | Faulk et al. | 363/72 |
| 5,903,452 | 5/1999 | Yang | 363/97 |
| 5,991,172 | 11/1999 | Javanovic et al. | 363/21 |

*Primary Examiner*—Peter S. Wong
*Assistant Examiner*—Bao Q. Vu
*Attorney, Agent, or Firm*—Reed Smith Shaw & McClay LLP

[57] ABSTRACT

A flyback converter including a transformer ($T_r$), having a primary winding ($W_P$) and having a secondary winding ($W_S$), wherein the primary winding is connected in series with a controlled switch (T) and an actuation circuit (A) to an input direct voltage ($U_P$), and the secondary winding is connected in series with a rectifier ($D_S$) and, downstream of the secondary winding, a charging capacitor ($C_S$); the actuation circuit (A) supplies start pulses of a fixed frequency for the switch, has a current sensor ($R_P$) for the current through the primary winding. Coupled with the secondary winding is a first rectifying amplifier ($K_U$) for comparing the output voltage ($U_S$) with an adjustable voltage reference value ($U_{RefU}$) and a second rectifying amplifier ($K_I$) for comparing the output current ($I_S$) with a adjustable current reference value ($U_{RefI}$), wherein as a control signal the combined and decoupled output signals of the two rectifying amplifiers and the output signal of the current sensor of the actuation circuit are supplied for the purpose of influencing the pulse duty radio, the maximum output of the converter-primary part is lower than the product of the output voltage ($U_{Amax}$) which can be adjusted to a maximum degree and the output current ($I_{Amax}$) which can be adjusted to a maximum degree, the reference values ($U_{RefU}$, $U_{RefI}$) which can be adjusted to a maximum degree to correspond to the voltage and current values with which the secondary part can be loaded to a maximum, and the level of the control signal ($U_S$) is limited by a limiter ($D_Z$), wherein the point ($U_Z$) at which the limiter is used is selected in such a way that a maximum breaking current in the primary circuit is established corresponding to the maximum permissible power loading of the primary circuit.

17 Claims, 2 Drawing Sheets

FIXED FREQUENCY FLYBACK CONVERTER

BACKGROUND OF THE INVENTION

1. Field of the Invention

This invention is concerned with a flyback converter having a transformer, having a primary winding and at least one secondary winding, wherein the primary winding is connected, in series and at least one secondary winding.

More specifically, the invention relates to a flyback converter wherein the primary winding is connected, in series supplies start pulses of a fixed frequency for the controlles switch, has a current sensor for the current through the primary winding. Coupled with the secondary winding is a first rectifying amplifier for comparing the amplifier for comparing the output current with an adjustable current reference value, wherein as a control signal the combined and decoupled output signals of the two rectifying amplifiers and the output signal of the current sensor of the actuation circuit are supplied for the purpose of influencing the pulse duty ratio, and the maximum output of the converter-primary part is lower than the product of the output voltage which can be adjusted to a maximum degree and the output current which can be adjusted to a maximum degree.

2. Description of the Related Art

Flyback converters are known and are widely used as mains power supply units for supplying current to electronic devices. For example, a known flyback converter is described as prior art in AT 403 535 B of the Applicant. A decisive cost factor for such mains power supply units is the power available to be drawn off since this, in particular, determines the costs for the transformer and smoothing means such as capacitors and throttles. A mains power supply unit of one construction type should, on the other hand, cover as many different applications as possible demanding different voltages and currents. For this reason mains power supply units are supplied with an adjustable voltage and adjustable current, for example a maximum of 30 volts, 3 amps. Within these limits the purchaser can then adjust the current and voltage, wherein as far as output is concerned the mains power supply unit, however, is fully used only at the highest voltage, in this case 30 volts×3 amps=90 watts. If, on the other hand, the purchaser adjusts the device to a low voltage, for example 3 volts, only a fraction of the power is available to him, namely in this example 3 volts×3 amps=9 watts. The device is not exploited according to its capabilities, in this case only to a tenth of its capability, and is unnecessarily expensive for the application concerned.

BRIEF SUMMARY OF THE INVENTION

An object of the invention is to overcome the above-notes disadvantage and to create a mains power supply unit which, even in the case of individual adjustment of current and voltage by the customer, fully exploits its capabilities.

This object is achieved on the basis of a flyback converter according to the invention and of the type mentioned in the introduction preamble before the description of the related art, so that in accordance with the invention the reference values which can be adjusted to a maximum degree correspond to the voltage and current values with which the secondary part can be loaded to a maximum and the level of the control signal is limited by a limiter, wherein the point at which the limiter is used is selected in such a way that a maximum breaking current in the primary circuit is established corresponding to the maximum permissible power loading of the primary circuit.

The invention provides for a flyback converter in which the capacity is no longer limited by the maximum current in the case of the maximum voltage, wherein the full capacity and therefore also a higher current is available even in the case of smaller voltages. The solution is also simple and inexpensive since with a fixed-frequency flyback converter the power to be transferred to the secondary side is dependent only on the frequency and the primary current and in order to limit the capacity it is sufficient to limit the switching current. It is sufficient to dimension the primary part together with the transformer to suit the maximum capacity and only the less expensive secondary part must be dimensioned both with respect to the maximum current and to the maximum voltage.

A particularly simple variation proposes that the limiter is a Zener diode.

A variation which is inexpensive to achieve and suitable for implementation makes provision for the outputs of the two rectifying amplifiers to be decoupled by means of diodes and a pull-up resistor.

It is also expedient that if the output signal of the current sensor is supplied to one input and the regulating signal is supplied to the other input of a third comparator, the output of which is connected to the reset input of a flip-flop actuating the switch, then constant-frequency pulses are applied to the set input, since in this embodiment only a few components are required.

Finally, in terms of an inexpensive solution it is also advisable for the current sensor to be a resistor.

The invention together with further advantages is explained in more detail hereinunder with the aid of an exemplified embodiment which is illustrated in the drawing. The individual figure thereof shows a very schematic representation of a circuit of a flyback converter in accordance with the invention.

DETAILED DESCRIPTION OF THE INVENTION

Referring now more particularly to the drawings, the flyback converter is explained in detail in connection with FIG. 1.

Figure 1:
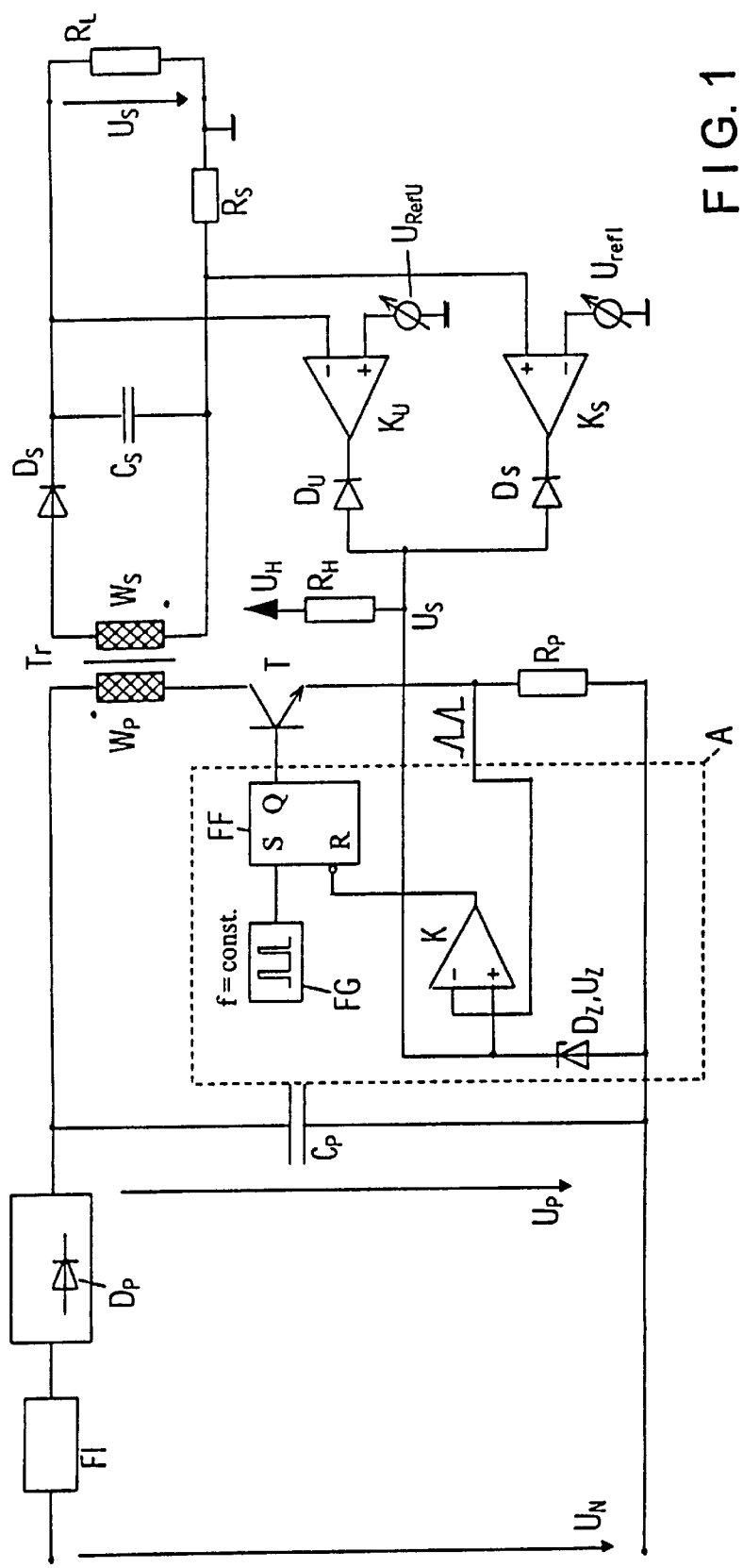
FIG. 1 as a circuit diagram of a flyback converter in accordance with the invention.

Specifically, the flyback converter in accordance with the invention illustrated in the FIG. 1 has a transformer $T_r$, with a primary winding $W_P$ and a secondary winding $W_S$, wherein on the secondary side a rectifier $D_S$, for example, an individual diode or a bridge rectifier, and a charging capacitor $C_S$ are provided. The output voltage $U_S$ is connected to the charging capacitor and the output current $I_S$ determined by a load $R_L$ flows via a sensor resistor $R_S$.

Returning to the primary side of the flyback converter it will be seen that a mains alternating voltage $U_n$ is rectified by means of a rectifier $D_P$ and is connected as a primary direct voltage $U_P$ to a primary capacitor $C_P$. A filter $F_I$ can also be provided in a known manner to prevent or reduce the reflow of interference into the mains.

The primary or input direct voltage $U_P$ is connected via a controlled switch T, in this case a switching transistor, to the primary winding $W_P$ of the transformer $T_r$, wherein a current sensor $R_P$ is also disposed in this series circuit. An actuation circuit, designated as a whole by A, actuates the switch T and in this exemplified embodiment contains a flip-flop FF, a frequency generator FG, a comparator K and a Zener diode $D_Z$, with a Zener voltage $U_Z$ as a limiter.

The pulses of the frequency generator FG are supplied to the set input of the flip-flop and initiate commencement of a switching pulse, wherein each pulse is terminated by a signal at the reset input of the flip-flop FF. The pulse duty ratio of the pulse produced determines the current through the switch T, the primary winding $W_P$ and the current sensor $R_P$, wherein in stationary operation the current which is increasing in a substantially linear manner and is measured by the current sensor $R_P$, from a certain level, namely the voltage applied to the non-inverting input of the comparator K, is supplied to reset the flip-flop and terminate the switching pulse.

Returning now to the secondary side it will be seen that output voltage $U_S$ is compared in a first rectifying amplifier $K_U$ with an adjustable voltage reference value $U_{RefU}$. The same is carried out with the current $I_S$ measured at the resistor $R_S$ and compared in a second rectifying amplifier $K_S$ with a reference value $U_{RefI}$ which can also be adjusted. The outputs of the two rectifying amplifiers $K_U$ and $K_S$ are supplied by decoupling diodes $D_U$ and $D_S$ to the non-inverting input of the comparator K, wherein the mutually connected anodes of the two diodes are connected by a pull-up resistor $R_H$ to an auxiliary direct voltage $U_H$ and the Zener diode $D_Z$ demands that a certain maximum voltage at this input cannot be exceeded. In this case the Zener voltage $U_Z=10$ V and the auxiliary voltage $U_H=25$ V.

During operation the output voltage $U_S$ can be adjusted within broad limits by the adjustable reference voltage source $U_{RefU}$, and likewise the current $I_S$ with the aid of the reference $U_{RefI}$, wherein the adjustment of the current generally serves to limit the current and the operation is carried out with a constant voltage $U_S$. In order not to exceed the maximum power—which is set first and foremost by the dimensioning of the transformer $T_r$ but also additionally by the dimensioning of very different components such as the switch T and the capacitor $C_P$—during operation the Zener diode $D_Z$ is provided in accordance with the invention as a limiter. In normal operation in which the maximum power value is not exceeded voltage regulation will generally be used and a predetermined voltage value will be connected to the output of the rectifying amplifier $K_U$ but will be lower than the Zener voltage of the diode $D_Z$. If then, with a predetermined voltage, the current is increased, for example, because the load resistance $R_L$ is lowered or because the reference voltage $U_{RefI}$ is increased, the voltage regulation is re-regulated in order to compensate for the now higher load, ie. the output voltage at the rectifying amplifier $K_U$ will increase. Above a certain current value this output voltage will be so high that the Zener diode $D_Z$ becomes conductive whereby the length of the switching pulse and the primary current, and therefore also the transferred power, is limited accordingly. The equivalent case arises if a constant current is drawn from the mains power supply unit and the voltage is increased.

Figure 2:
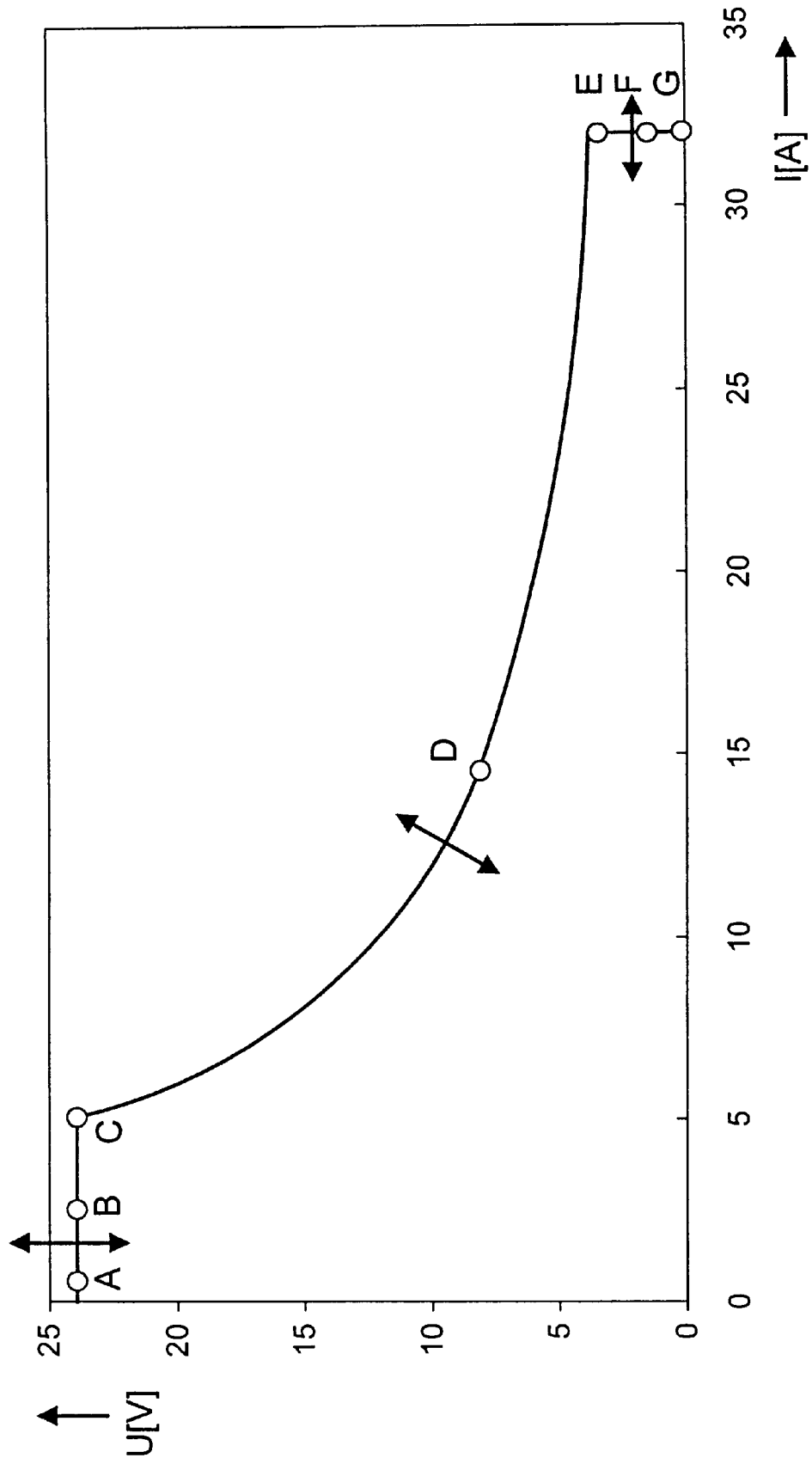
FIG. 2 is a graphical representation of a diagram illustrating the maximum limits of adjustment of either the output voltage or output current.

Reference is made hereinunder to FIG. 2 which constitutes a diagram of the maximum limits of adjustment of the output voltage or output current. With the aid of this diagram the invention will be explained again using a specific example. The voltage is set to a maximum at one working point at the top left in the diagram, wherein the output of the rectifying amplifier $K_U$ for the voltage is at a potential of 1 V, in contrast, the output of the rectifying amplifier $K_S$ for the current lies within the positive overload point limit. The control signal $U_S$ amounts to about 1.7 V. At the working point C the output of the rectifying amplifier $K_U$ has a voltage of about 5 V, the output of the rectifying amplifier $K_S$ for the current is still within the positive overload limit and the control signal amounts to 5.7 V. At the working point C the output of the rectifying amplifier $K_U$ for the voltage is at a potential of about 9.3 V, the output of the rectifying amplifier $K_S$ for the current is still within the positive overload limit and the control signal is 10 V.

At the working point D the output of the rectifying amplifier $K_U$ for the voltage has in the meantime reached its positive overload limit, the output of the rectifying amplifier $K_S$ for the current is also within the positive overload limit and the control signal is limited by the Zener diode $D_Z$ to 10 V. The working point D is located on the power dissipation curve which terminates towards the right at the working point E. The output of the rectifying amplifier $K_U$ for the voltage is still within the positive overload limit, the output of the rectifying amplifier $K_S$ for the current is, in contrast, at a potential of about 9.3 V and the control signal is still 10 V. At the working point F the output of the rectifying amplifier $K_U$ for the voltage is still within the positive overload limit, the output of the rectifying amplifier $K_S$ for the current is, in contrast, still only at a potential of about 2 V and the control signal is 2.7 V. At the working point G the output of the rectifying amplifier $K_U$ for the voltage is within the positive overload limit, the output of the rectifying amplifier $K_S$ for the current is at a potential of about 1 V and the control signal is 1.7 V.

It will be obvious to the person skilled in the art in the field of switched mode mains power supply units that the actuation circuit A can also be produced in a different manner provided that only the level of the control signal, which is designated $s_Z$ and is derived from the decoupled outputs of the rectifying amplifiers $K_U$ and $K_S$, is limited. The limiter can also be produced in a different way than by using a Zener diode $D_Z$. The rectifying amplifiers $K_U$ and $K_S$, which are designated herein as disconnected difference amplifiers, are generally connected to additional circuit elements, in particular RC members for achieving the desired regulating characteristics, and likewise in many cases the control signal $U_S$ is dc-isolated between the primary and secondary side with the aid of an optical coupler.

With the aid of the invention a flyback converter in accordance with the invention can be used universally within a certain power range since the user is free to choose the voltage and/or the current according to requirements, wherein, however, the maximum possible power is still available. The primary part of the flyback converter must be dimensioned with respect to this power, but when dimensioning the secondary part it is merely necessary to consider the maximum current which may occur or the maximum voltage which may occur.

What is claimed is:

1. A flyback converter provided with a transformer, having a primary winding and having a secondary winding, the primary winding being connected in series with a controlled switch to an input direct voltage and the secondary winding being connected in series to a rectifier and a charging capacitor connected downstream of the secondary winding, comprising:

an actuation circuit for supplying start pulses of a fixed frequency for the controlled switch, said actuation circuit including a current sensor for current flowing through the primary winding, a first rectifying amplifier for comparing the output voltage with an adjustable voltage reference value, a second rectifying amplifier for comparing the output current with an adjustable current reference value as a control signal derived from the output signals of the two rectifying amplifiers and the output signal of the current sensor of the actuation circuit is supplied for the purpose of influencing the pulse duty ratio, and the maximum output of the converter-primary part is lower than the product of the output voltage which can be adjusted to a maximum degree and the output current which can be adjusted to a maximum degree; wherein the reference values which can be adjusted to a maximum degree correspond to the voltage and current values with which the secondary part can be loaded to a maximum, and the level of the control signal is limited by a limiter, wherein the point at which the limiter is used is selected in such a way that a maximum breaking current in the primary circuit is established corresponding to the maximum permissible power loading of the primary circuit.

2. The flyback converter according to claim 1, wherein the limiter is a Zener diode.

3. The flyback converter according to claim 1, where the outputs of the two rectifying amplifiers are decoupled by means of diodes and a pull-up resistor.

4. The flyback converter according to claim 2, where the outputs of the two rectifying amplifiers, are decoupled by means of diodes and a pull-up resistor.

5. The flyback converter according to claim 1 wherein the output signal of the current sensor is supplied to one input and the regulating signal is supplied to another input of a third comparator, the output of which is connected to the reset input of a flip-flop actuating the switch, wherein the constant-frequency pulses are applied to the set input.

6. The flyback converter according to claim 2 wherein the output signal of the current sensor is supplied to one input and the regulating signal is supplied to another input of a third comparator, the output of which is connected to the reset input of a flip-flop actuating the switch, wherein the constant-frequency pulses are applied to the set input.

7. The flyback converter according to claim 3 wherein the output signal of the current sensor is supplied to one input and the regulating signal is supplied to another input of a third comparator, the output of which is connected to the reset input of a flip-flop actuating the switch, wherein the constant-frequency pulses are applied to the set input.

8. The flyback converter according to claim 4 wherein the output signal of the current sensor is supplied to one input and the regulating signal is supplied to another input of a third comparator, the output of which is connected to the reset input of a flip-flop actuating the switch, wherein the constant-frequency pulses are applied to the set input.

9. The flyback converter according to claim 1, wherein the current sensor is a resistor.

10. The flyback converter according to claim 2, wherein the current sensor is a resistor.

11. The flyback converter according to claim 9, wherein the current sensor is a resistor.

12. The flyback converter according to claim 4, wherein the current sensor is a resistor.

13. The flyback converter according to claim 5, wherein the current sensor is a resistor.

14. The flyback converter according to claim 6, wherein the current sensor is a resistor.

15. The flyback converter according to claim 7, wherein the current sensor is a resistor.

16. The flyback converter according to claim 8, wherein the current sensor is a resistor.

17. The flyback converter according to claim 1, wherein in stationary operation the current through the controlled switch is measured by the current sensor and the voltage applied to the non-inverting input of the comparator is supplied to reset the flip-flop and terminate the switching pulse.

* * * * *